United States Patent
Blick et al.

(10) Patent No.: US 8,100,017 B1
(45) Date of Patent: Jan. 24, 2012

(54) VIBRATION TEST APPARATUS WITH AN ACTUATOR COUPLED TO A REACTION MASS MOVABLE ALONG A LINEAR AXIS

(75) Inventors: Daniel F. Blick, Moss Beach, CA (US); Michael J. Herrmann, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 408 days.

(21) Appl. No.: 12/484,679

(22) Filed: Jun. 15, 2009

(51) Int. Cl.
*G01M 7/04* (2006.01)
(52) U.S. Cl. .......................... 73/666; 73/668; 29/592.1
(58) Field of Classification Search .................... 73/662, 73/663, 666, 668; 29/592.1
See application file for complete search history.

(56) References Cited

U.S. PATENT DOCUMENTS

| | | | |
|---|---|---|---|
| 4,499,772 A * | 2/1985 | Haas | 73/666 |
| 6,131,461 A | 10/2000 | Leist | |
| 6,330,828 B1 | 12/2001 | Nagl et al. | |
| 7,013,731 B1 | 3/2006 | Szeremeta et al. | |
| 2002/0184952 A1 | 12/2002 | Leist et al. | |

OTHER PUBLICATIONS

"High Precision Mechanical Bearings Linear-Motor-Driven Stages", http://www.aerotech.com/products/stages/Linear_motor_stages.html, downloaded on Oct. 28, 2008 from www.aerotech.com.

* cited by examiner

*Primary Examiner* — John Chapman, Jr.

(57) ABSTRACT

A testing apparatus, for subjecting a device-under-test to oscillating acceleration, includes a stage having a mounting surface attachable to the device-under-test. An actuator is coupled to the stage, and also coupled to a reaction mass movable along a linear axis. A first flexure plate has a first flexure plate middle and a first flexure plate periphery, with the first flexure plate middle attached to the stage at a first stage end. A second flexure plate has a second flexure plate middle and a second flexure plate periphery, with the second flexure plate middle attached to the stage at a second stage end that opposes the first stage end. The first flexure plate periphery and the second flexure plate periphery are attached to the frame. The first and second flexure plates define major surfaces that are substantially perpendicular to the linear axis.

20 Claims, 5 Drawing Sheets

VIBRATION TEST APPARATUS WITH AN ACTUATOR COUPLED TO A REACTION MASS MOVABLE ALONG A LINEAR AXIS

FIELD OF THE INVENTION

The present invention relates generally to vibration testing apparatuses and in particular to apparatuses for vibration testing of information storage devices.

BACKGROUND

Information storage devices are commonly used in environments that include vibration with vibration frequencies higher than 500 Hz. For example, sources of such vibration may include audio vibration from speakers driven by notebook personal computers, and/or cooling fans like those that are typically mounted in desktop or server computer systems. Unfortunately, some information storage devices (for example, hard disk drives) are especially sensitive to such vibration. For example, the operation of a hard disk drive depends upon the ability of a servo control system to precisely control the position of a read/write head relative to tracks of information on an adjacent spinning disk. However, the bandwidth of a typical servo control system limits its ability to correct positioning errors that fluctuate faster than 500 Hz. Indeed, some servo control systems used in hard disk drives may undesirably amplify, rather than correct or attenuate, position errors that fluctuate in the range of 1000-4000 Hz. Hence, it is important for manufacturers and customers to test the performance and/or robustness of hard disk drives and other devices under conditions that include such vibration.

Many contemporary electro-dynamic vibration testing apparatuses, also known as "shakers," use a large motor to subject devices-under-test to vibration. For example, the voice coil motor may apply an oscillating force to a so-called slip table to which the device-under-test is mounted. Such shakers are typically expensive, requiring a motor that can develop large forces (e.g. 5000 lbf). Such shakers are also typically heavy, often having resonances in the 700-2000 Hz range. Bearings or rollers, designed to constrain the motion of these shakers, can contribute noise in the shaker acceleration. If required to accomplish vibration testing at a frequency in the range of its own resonances, such contemporary electro-dynamic shakers may also exhibit excessive harmonic distortion and/or off-axis accelerations (i.e. accelerations having an excessive component that is orthogonal to the nominal vibration direction). Although such large shakers may serve with adequate repeatability and linearity for certain conventional vibration tests, at higher frequencies and lower amplitudes harmonic distortion and unspecified off-axis vibration components often render such shakers inadequate. For example, if the desired amplitude of applied acceleration fluctuation is low (e.g. 0.2 g), in some cases the undesired off-axis component may even exceed the testing accelerations in the desired testing direction.

Thus, there is a need in the art for a vibration testing apparatus with reduced off-axis motion, noise, and/or harmonic distortion.

SUMMARY

A testing apparatus for subjecting a device-under-test to oscillating acceleration, and a method for assembling the testing apparatus, is disclosed. The testing apparatus includes a stage having a mounting surface attachable to the device-under-test. An actuator is coupled to the stage, and also coupled to a reaction mass movable along a linear axis. A first flexure plate has a first flexure plate middle and a first flexure plate periphery, with the first flexure plate middle attached to the stage at a first stage end. A second flexure plate has a second flexure plate middle and a second flexure plate periphery, with the second flexure plate middle attached to the stage at a second stage end that opposes the first stage end. The first flexure plate periphery and the second flexure plate periphery are attached to the frame. The first flexure plate defines a first flexure plate major surface that is substantially perpendicular to the linear axis. The second flexure plate defines a second flexure plate major surface that is also substantially perpendicular to the linear axis.

DESCRIPTION OF THE PREFERRED EMBODIMENTS

Figure 1:
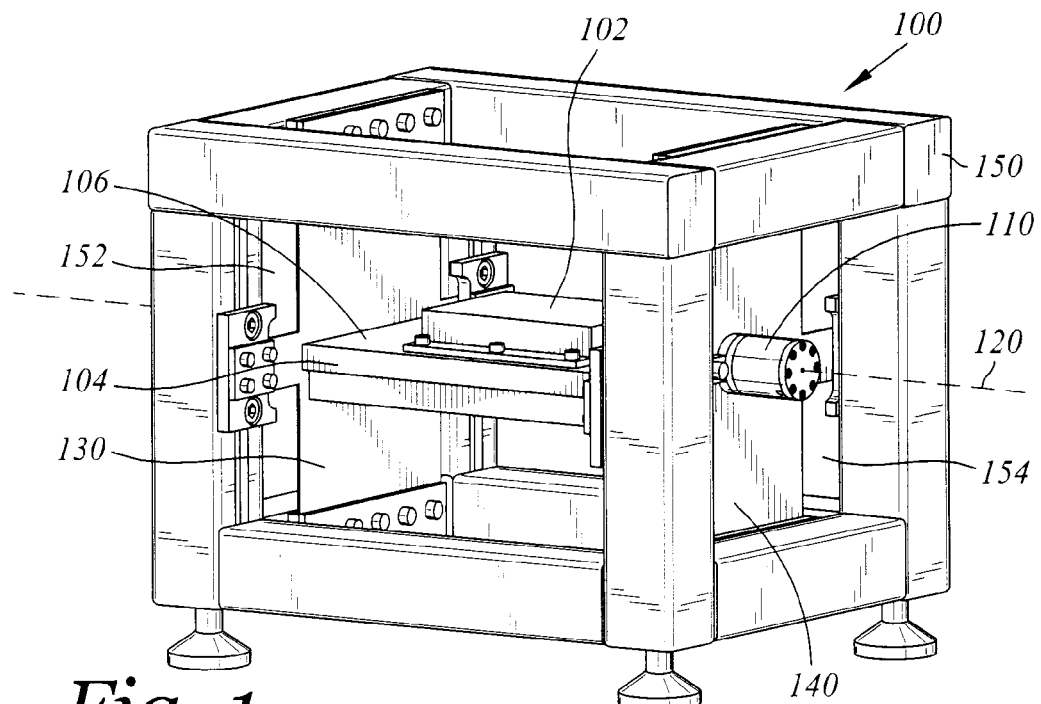
FIG. 1 is a perspective view of a testing apparatus according to an embodiment of the present invention.

FIG. 1 is a perspective view of a testing apparatus 100 for subjecting a device-under-test 102 to oscillating acceleration, according to an embodiment of the present invention. The testing apparatus 100 includes a stage 104 having a mounting surface 106 attachable to the device-under-test 102 (for example, attachable to an information storage device like a hard disk drive). The testing apparatus 100 also includes a linear actuator 110 that is coupled to the stage 104. The linear actuator 110 is also coupled to a reaction mass (internal to actuator 110) that is movable along a linear axis 120. In certain embodiments, the linear actuator 110 may include an electromagnetic solenoid. In certain other embodiments, the linear actuator 110 may include a piezoelectric element. In certain embodiments, the linear axis 120 is preferably no further than 5 mm from an overall moving mass center of gravity, where the overall moving mass center of gravity is defined as the center of gravity of the stage 104 together with the linear actuator 110 and the device-under-test 102 (when attached to the stage 104). In such embodiments this design constraint may advantageously reduce harmonic distortion and/or off-axis motion.

The testing apparatus 100 also includes a first flexure plate 130 that is attached to the stage 104 at a first stage end (leftmost end of the stage in FIG. 1), and a second flexure plate 140 that is attached to the stage 104 at an opposing second stage end (rightmost end of the stage in FIG. 1). The testing apparatus 100 also includes a frame 150 to which both the first flexure plate 130 and the second flexure plate 140 are attached. In the embodiment of FIG. 1, the frame 150 is preferably a one-piece frame (e.g. comprising aluminum) that itself maintains the spatial relationship between its sides. Although the frame 150 can rest on a floor or table, it does not depend on the floor or table to maintain the spatial relationship between its sides. Alternatively, the frame 150 may include a plurality of separate frame pieces, each attachable to a supporting table in order to maintain the spatial relationship between its sides. For example, in such an alternative embodiment, the frame might comprise a left flexure plate support and a separate right flexure plate support, each being attached to a vibration isolation table that includes a hole pattern, so that the vibration isolation table can help maintain the spatial relationship between the left flexure plate support and the right flexure plate support.

Creating the linear vibration excitation using a reaction mass that is coupled to the stage 104, rather than applying a force to the stage 104 externally (e.g. via an actuator or magnetic field anchored to the frame 150), may advantageously reduce the excitation of the frame 150 since the frame 150 may be effectively isolated from high frequency motions of the linear actuator 110 by the first and second flexure plates 130, 140. With frame vibrations and associated distortions reduced, undesirable off-axis motion may also be reduced, in certain embodiments preferably to a level that is less than 10% (e.g. 0.1 g off axis acceleration per 1 g acceleration in desired direction of travel of stage 104).

In the embodiment of FIG. 1, the first flexure plate 130 defines a first flexure plate major surface that is substantially perpendicular to the linear axis 120, and the second flexure plate 140 defines a second flexure plate major surface that is also substantially perpendicular to the linear axis 120. For example, in certain embodiments, a normal to the first flexure plate major surface is preferably within 1° of being parallel to the linear axis 120, and a normal to the second flexure plate major surface is preferably within 1° of being parallel to the linear axis 120. Also in the embodiment of FIG. 1, the linear actuator 110 is coupled to the stage 104 by being attached to the second flexure plate 140, rather than being disposed between the first and second flexure plates 130, 140.

Figure 2:
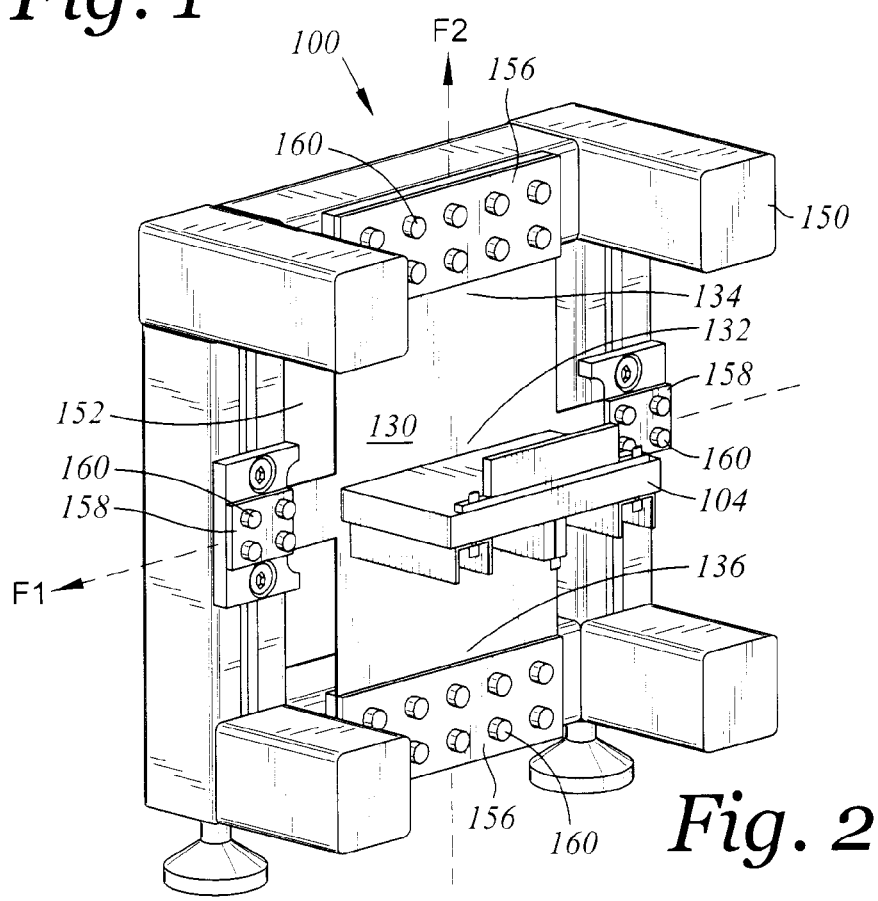
FIG. 2 is a cross-sectional view of the testing apparatus of FIG. 1.

FIG. 2 is a cross-sectional view of the left side of testing apparatus 100 of FIG. 1. Now referring additionally to FIG. 2, the first flexure plate 130 has a first flexure plate middle 132 and a first flexure plate periphery 134, 136. It can be seen that the first flexure plate middle 132 is attached to the stage 104, while the first flexure plate periphery 134, 136 is attached to the frame 150. Note that the first flexure plate middle 132 may not be located strictly at the centroid of the first flexure plate 130, but rather may just be near the centroid (as labeled in FIG. 2) Likewise, the first flexure plate periphery 134, 136 need not narrowly refer to only the edges of the first flexure plate 130, but rather refers to regions of the first flexure plate 130 that are near the edge (as labeled in FIG. 2). Although not shown in the cross-sectional view of FIG. 2, on the right side of the testing apparatus 100, the second flexure plate 140 likewise has a second flexure plate middle and a second flexure plate periphery, with the second flexure plate middle attached to the stage 104 and the second flexure plate periphery attached to the frame 150.

In the embodiment of FIGS. 1-2, the frame 150 includes a first aperture 152 with the first flexure plate 130 spanning the first aperture 152. The frame 150 also includes a second aperture 154 with the second flexure plate 140 spanning the second aperture 154. In this regard, the first flexure plate 130 spans the first aperture 152 in the sense that the first flexure plate 130 extends all the way from one side of the first aperture 152 to another side of the first aperture 152. Likewise, the second flexure plate 140 spans the second aperture 154 in the sense that the second flexure plate 140 extends all the way from one side of the second aperture 154 to another side of the second aperture 154. Although the flexure plate 130 is preferably attached to the frame 150 in both the peripheral regions 134 and 136 (as shown in FIGS. 1 and 2), in certain embodiments the flexure plate 130 may alternatively be shortened and attached at only one peripheral region so as to be cantilevered rather than doubly-supported. In such cantilevered embodiments, the first flexure plate 130 may not span the first aperture 152.

In the embodiment of FIGS. 1-2, the first and second flexure plates 130, 140 are each single-piece diaphragms having a cross-shape. However, alternatively the flexure plates may each comprise a combination of subcomponent plates, and may take other shapes (such as a rectangular shape). More specifically, in the embodiment of FIG. 2, the cross shape of the first flexure plate 130 has a portion that extends in an F1 direction and a portion that extends in an F2 direction. Note that in the embodiment of FIGS. 1-2, the F2 direction is substantially perpendicular to the F1 direction, and both the F1 and F2 directions are substantially perpendicular to the linear axis 120. In the embodiment of FIG. 2, it can be seen that the F2 direction is optionally substantially vertical and the F1 direction is optionally substantially horizontal, but these directions may be instead be rotated to have another orientation with respect to gravity (just as a+may be rotated to instead appear as an X).

In an alternative embodiment, the first flexure plate may include a plate sub-component extending in the F1 direction, and another separate but attached plate sub-component extending in the F2 direction (rather than being of monolithic single-piece construction as shown in FIG. 2). Likewise, the second flexure plate may include a plate sub-component extending parallel to the F1 direction, and another separate but attached plate sub-component extending parallel to the F2 direction.

In the embodiment of FIG. 2, the first flexure plate periphery 134, 136 is clamped to the frame 150 by a plurality of clamping plates 156, 158 of the frame 150. For example, the clamping plates 156 are adjacent the first flexure periphery 134, 136. Each of the plurality of clamping plates 156, 158 is affixed to the frame 150 by a plurality of clamping screws 160. For example, in the embodiment of FIG. 2, each of the clamping plates 156 is affixed to the frame 150 by ten clamping screws 160, while each of the clamping plates 158 is affixed to the frame 150 by four clamping screws 160. In certain embodiments, clamping the first and second flexure plates 130, 140 can lead to a more repeatable boundary condition on the flexures, and reduce stress concentrations at the locations of the adjoining fasteners, so that the dynamic response of the vibration testing apparatus 100 can be more controlled and predictable.

In the embodiment of FIGS. 1-2, the first and second flexure plates 130, 140 may comprise steel, for example, and have a thickness in the range 0.05 mm to 0.3 mm. In certain embodiments the first flexure plate 130 defines a flexure plate length (measured as a minimum distance between clamping plates 156) in the range 40 mm to 160 mm. In certain embodiments, these dimensional limitations may ensure adequate dynamic response in desired frequency ranges for the testing apparatus 100.

Figure 3:
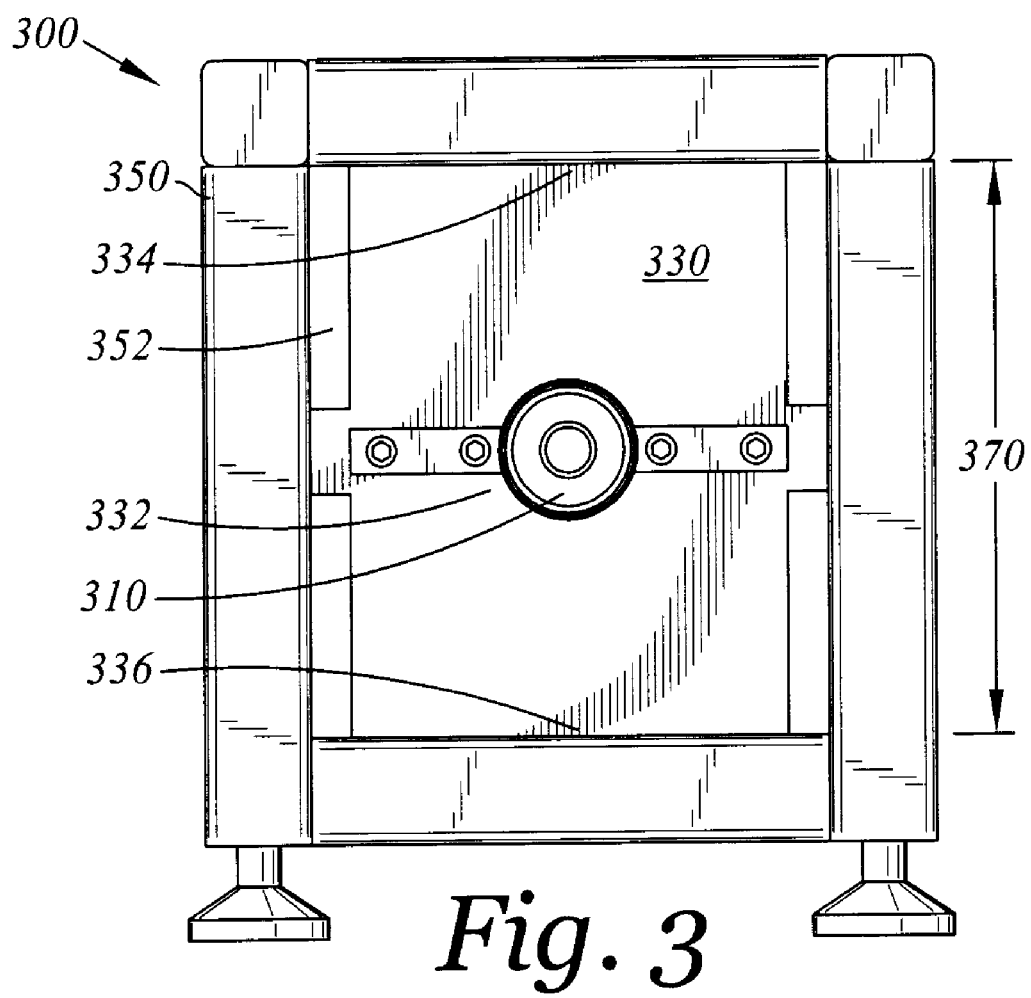
FIG. 3 is an end view of a testing apparatus according to another embodiment of the present invention.

FIG. 3 is an end view of a testing apparatus 300 according to another embodiment of the present invention. The testing apparatus 300 includes an audio speaker 310, which in certain embodiments may function acceptably as a linear actuator. That is, the audio speaker 310 includes a reaction mass that, in certain embodiments, moves acceptably linearly and with acceptable dynamic response in a frequency range of interest (e.g. 500 Hz-20 kHz in certain embodiments). In the embodiment of FIG. 3, the audio speaker 310 is attached to a first flexure plate 330, and a frame 350 includes a first aperture 352 with the first flexure plate 330 spanning the first aperture 352. In this regard, the first flexure plate 330 spans the first aperture 352 in the sense that the first flexure plate 330 extends all the way from one side of the first aperture 352 to another side of the first aperture 352.

Also in the embodiment of FIG. 3, the first flexure plate 330 has a first flexure plate middle 332 and a first flexure plate periphery 334, 336. It can be seen that the audio speaker 310 is attached near the first flexure plate middle 332, while the first flexure plate periphery 334, 336 is attached to a frame 350. Note that the first flexure plate middle 332 may not be located strictly at the centroid of the first flexure plate 330, but rather may just be near the centroid (as labeled in FIG. 3). In certain embodiments, the first flexure plate 330 may comprise steel, have a thickness in the range 0.05 mm to 0.3 mm, and define a flexure plate length 370 in the range 40 mm to 160 mm (measured as a free length of the first flexure plate between the locations where it is clamped near the first flexure plate periphery 334, 336). In certain embodiments, these dimensional limitations may ensure adequate dynamic response in a desired frequency range for the testing apparatus 300.

Figure 4:
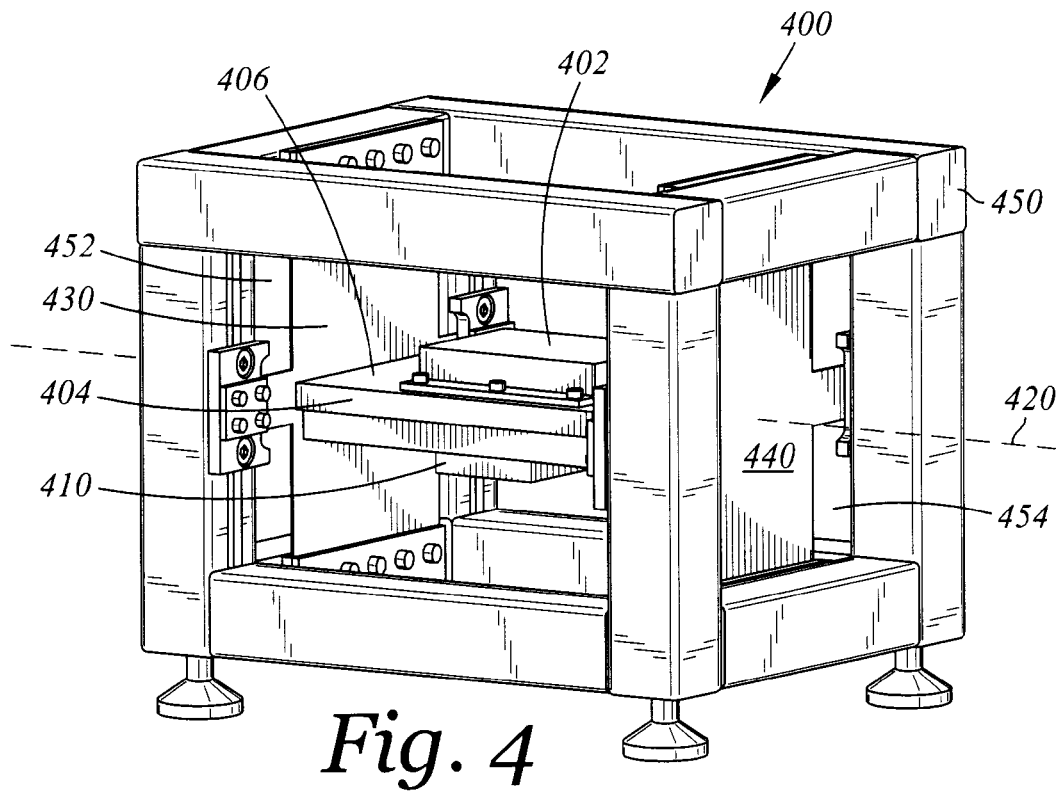
FIG. 4 is a perspective view of a testing apparatus according to another embodiment of the present invention.
Figure 5:
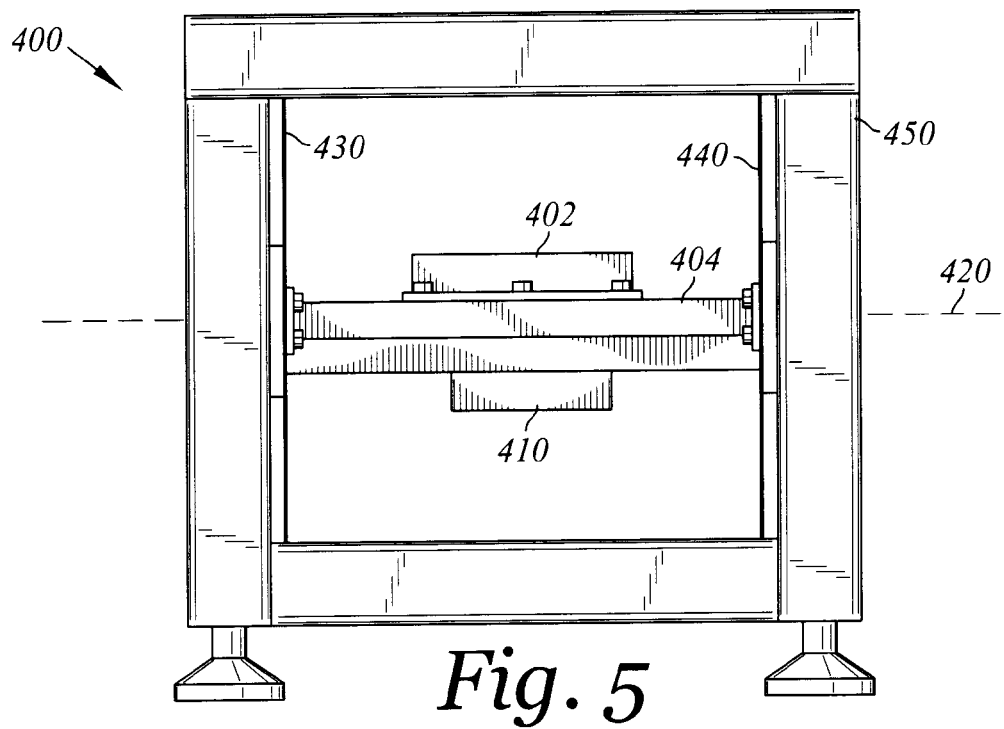
FIG. 5 is a front view of the testing apparatus of FIG. 4.

FIG. 4 is a perspective view of a testing apparatus 400 for subjecting a device-under-test 402 to oscillating acceleration, according to another embodiment of the present invention. FIG. 5 is a front view of the testing apparatus 400 of FIG. 4. The testing apparatus 400 includes a stage 404 having a mounting surface 406 attachable to the device-under-test 402. The testing apparatus 400 also includes a linear actuator 410 that is attached to the underside of stage 404. In certain embodiments, the linear actuator 410 may include an electromagnetic solenoid. In certain other embodiments, the linear actuator 410 may include a piezoelectric element.

A bottom portion of the linear actuator 410 is visible in FIGS. 4-5. Preferably, the linear actuator 410 protrudes upwards into a groove in the stage 404 (or, alternatively, is embedded in the stage 404) so that the linear actuator 410 can act along the linear axis 420. That is, the linear actuator 410 is preferably coupled to a reaction mass (internal to actuator 410 and/or stage 404) that is movable along a linear axis 420. In certain embodiments, the linear axis 420 is preferably no further than 5 mm from an overall moving mass center of gravity, where the overall moving mass center of gravity is defined as the center of gravity of the stage 404 together with the linear actuator 410 and the device-under-test 402 (when attached to the stage 404). In such embodiments this design constraint may advantageously reduce harmonic distortion and/or off-axis motion.

The testing apparatus 400 also includes a first flexure plate 430 that is attached to the stage 404 at a first stage end (leftmost end of the stage in FIG. 5), and a second flexure plate 440 that is attached to the stage 404 at an opposing second stage end (rightmost end of the stage in FIG. 5). The testing apparatus 400 also includes a frame 450 to which both the first flexure plate 430 and the second flexure plate 440 are attached.

Creating the linear vibration excitation using a reaction mass that is coupled to the stage 404, rather than applying a force to the stage 404 externally (e.g. via an actuator or magnetic field anchored to the frame 450), may advantageously reduce the excitation of the frame 450 since the frame 450 may be effectively isolated from high frequency motions of the linear actuator 410 by the first and second flexure plates 430, 440. With frame vibrations and associated distortions reduced, undesirable off-axis motion may also be reduced, in certain embodiments preferably to a level that is less than 10% (e.g. 0.1 g off axis acceleration per 1 g acceleration in the desired direction of travel of stage 404).

In the embodiment of FIGS. 4-5, the first flexure plate 430 defines a first flexure plate major surface that is substantially perpendicular to the linear axis 420, and the second flexure plate 440 defines a second flexure plate major surface that is also substantially perpendicular to the linear axis 420. For example, in certain embodiments, a normal to the first flexure plate major surface is preferably within 1° of being parallel to the linear axis 420, and a normal to the second flexure plate major surface is preferably within 1° of being parallel to the linear axis 420. Also in the embodiment of FIG. 4, the linear actuator 410 is coupled to the stage 404 by being attached to it between the first and second flexure plates 430, 440.

Figure 6:
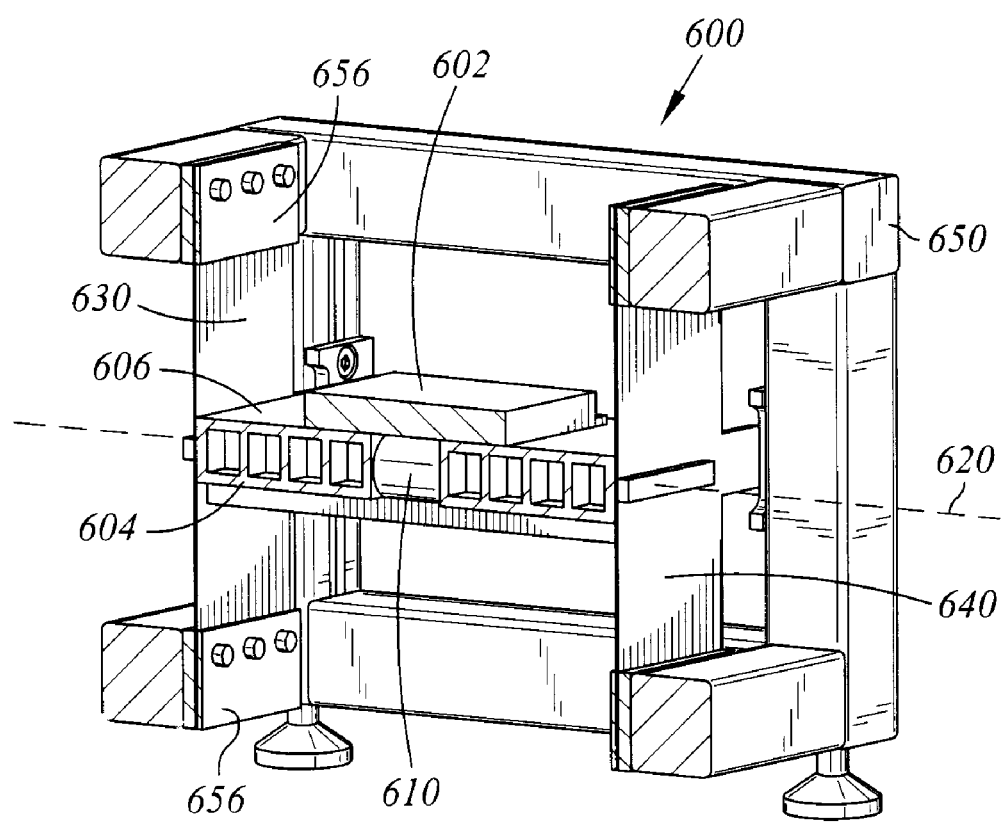
FIG. 6 is a perspective cross-sectional view of a testing apparatus according to another embodiment of the present invention.

FIG. 6 is a perspective cross-sectional view of a testing apparatus 600 for subjecting a device-under-test 602 (e.g. a disk drive) to oscillating acceleration, according to another embodiment of the present invention. The testing apparatus 600 includes a stage 604 having a mounting surface 606 attachable to the device-under-test 602. The testing apparatus 600 also includes a linear actuator 610 that is embedded in a stage 604 such that the linear actuator 610 can act along the linear axis 620. In certain embodiments, the linear actuator 610 may include an electromagnetic solenoid. In certain other embodiments, the linear actuator 610 may include a piezoelectric element.

The linear actuator 610 is preferably coupled to a reaction mass (internal to actuator 610) that is movable along a linear axis 620. In certain embodiments, the linear axis 620 is preferably no further than 5 mm from an overall moving mass center of gravity, where the overall moving mass center of gravity is defined as the center of gravity of the stage 604 together with the linear actuator 610 and the device-under-test 602 (when attached to the stage 604). In such embodiments this design constraint may advantageously reduce harmonic distortion and/or off-axis motion.

The testing apparatus 600 also includes a first flexure plate 630 that is attached to the stage 604 at a first stage end (leftmost end of the stage in FIG. 6), for example by clamps 656. The testing apparatus 600 also includes a second flexure plate 640 that is attached to the stage 604 at an opposing second stage end (rightmost end of the stage in FIG. 6). The testing apparatus 600 also includes a frame 650 to which both the first flexure plate 630 and the second flexure plate 640 are attached.

Creating the linear vibration excitation using a reaction mass that is coupled to the stage 604, rather than applying a force to the stage 604 externally (e.g. via an actuator or magnetic field anchored to the frame 650), may advantageously reduce the excitation of the frame 450 since the frame 450 may be effectively isolated from high frequency motions of the linear actuator 610 by the first and second flexure plates 630, 640. With frame vibrations and associated distortions reduced, undesirable off-axis motion may also be reduced, in certain embodiments preferably to a level that is less than 10% (e.g. 0.1 g off axis acceleration per 1 g acceleration in the desired direction of travel of stage 404).

In the embodiment of FIG. 6, the first flexure plate 630 defines a first flexure plate major surface that is substantially perpendicular to the linear axis 620, and the second flexure plate 640 defines a second flexure plate major surface that is also substantially perpendicular to the linear axis 620. For example, in certain embodiments, a normal to the first flexure plate major surface is preferably within 1° of being parallel to the linear axis 620, and a normal to the second flexure plate major surface is preferably within 1° of being parallel to the linear axis 620. Also in the embodiment of FIG. 6, the linear actuator 610 is coupled to the stage 604 by being attached to it between the first and second flexure plates 630, 640.

Figure 7:
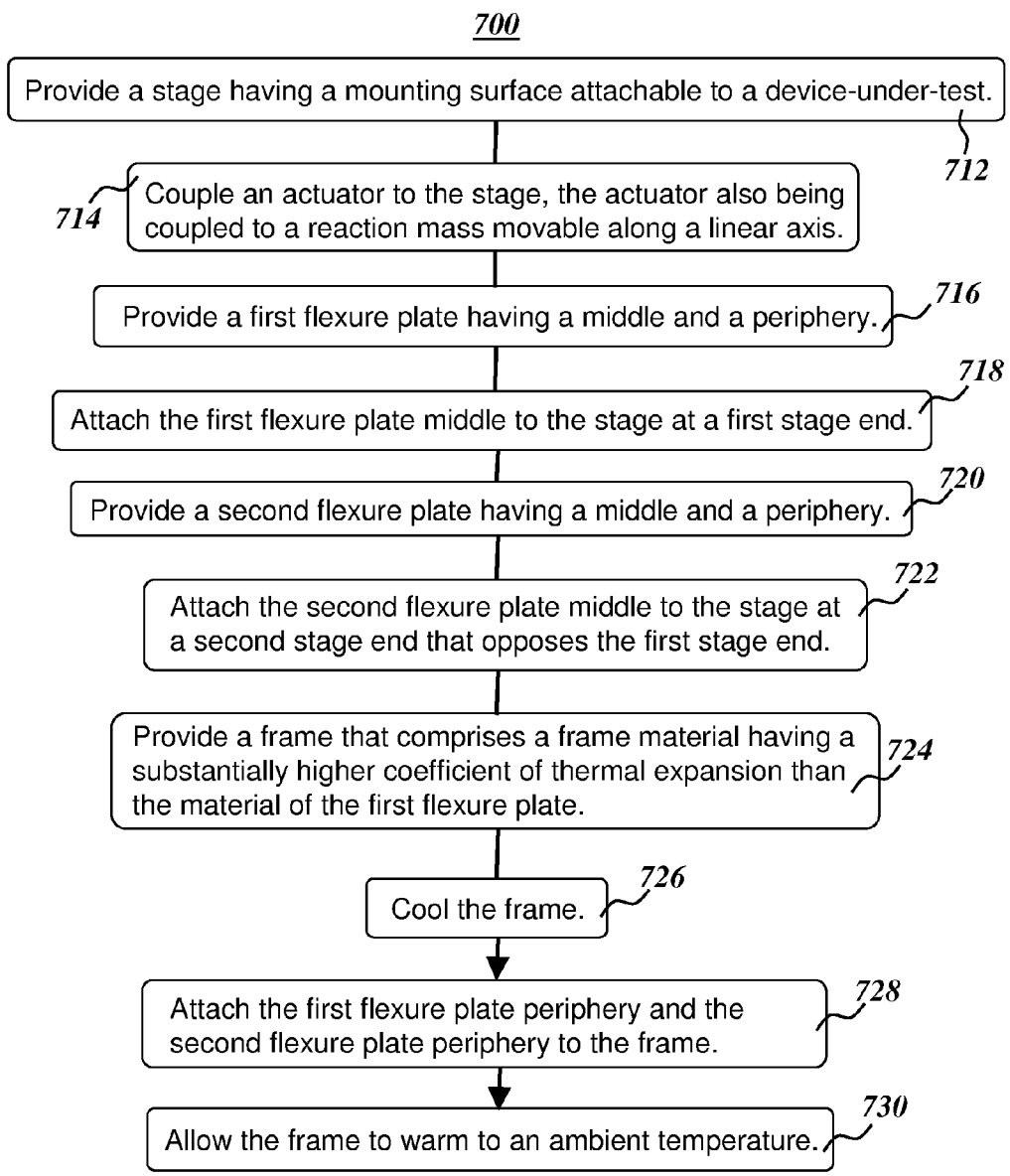
FIG. 7 is a flow chart of a method to assemble a testing apparatus, according to an embodiment of the present invention.

FIG. 7 depicts a flow chart of a method 700 to assemble a testing apparatus for subjecting a device-under-test to oscillating acceleration, according to an embodiment of the present invention. In step 712, a stage is provided, the stage having a mounting surface attachable to the device-under-test (for example, attachable to an information storage device like a hard disk drive). In step 714, an actuator is coupled to the stage, the actuator also being coupled to a reaction mass movable along a linear axis. For example, an audio speaker may be coupled to the stage. In step 716, a first flexure plate is provided. The first flexure plate comprises a first material (e.g. steel) and has a first flexure plate middle and a first flexure plate periphery. In step 718, the first flexure plate middle is attached to the stage at a first stage end, for example by threaded fasteners. In step 720, a second flexure plate is provided. The second flexure plate comprises the first material and has a second flexure plate middle and a second flexure plate periphery. In step 722, the second flexure plate middle is attached to the stage at a second stage end that opposes the first stage end. In step 724, a frame that comprises a second material (e.g. aluminum), having a substantially higher coefficient of thermal expansion than the first material, is provided. In step 726, the frame is cooled to a reduced temperature that is preferably but not necessarily below an ambient temperature. Preferably, the reduced temperature is at least at least 10° C. below the ambient temperature. In step 728, the first flexure plate periphery and the second flexure plate periphery are attached to the frame, preferably while the frame is at least 10° C. below the ambient temperature.

In the embodiment of FIG. 7, the frame is allowed to warm to an ambient temperature in step 730, after the attaching of the first flexure plate periphery and the second flexure plate periphery to the frame. Preferably but not necessarily, the cooling of the frame in step 726 is sufficient that the warming in step 730 induces a tensile strain on the first and second flexure plates of at least 1.5 Mpa (due to the coefficient of thermal expansion difference between the first material and the second material). Such thermal flexure plate tensioning may give the vibration testing apparatus improved resonance characteristics and reduce harmonic distortion and/or unspecified off-axis motion, for example by reducing or eliminating non-linearities in the dynamic response of the flexure(s).

Although the exemplary method of FIG. 7 includes tensioning of the flexure plates by cooling, fabrication of the previously described vibration testing apparatus 100 (and/or 400 and/or 600) does not strictly require that such a thermal flexure tensioning method be performed. Acceptable resonance characteristics of the vibration testing apparatus might as well be obtained by annealing the flexure plates, and/or ensuring that an adequately tight flatness or thickness specification be met for the flexure plates, and/or ensuring adequate precision in the orientation and clamping of the flexure plates, and/or non-thermal methods of tensioning.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," and "having," as used herein are intended to be read as open-ended terms.

We claim:

1. A testing apparatus for subjecting a device-under-test to oscillating acceleration, the testing apparatus comprising:
    a stage having a mounting surface attachable to the device-under-test; and
    an actuator coupled to the stage, the actuator also coupled to a reaction mass movable along a linear axis;
    a first flexure plate having a first flexure plate middle and a first flexure plate periphery, the first flexure plate middle attached to the stage at a first stage end,
    a second flexure plate having a second flexure plate middle and a second flexure plate periphery, the second flexure plate middle attached to the stage at a second stage end that opposes the first stage end, and
    a frame, the first flexure plate periphery and the second flexure plate periphery attached to the frame,
    wherein the first flexure plate defines a first flexure plate major surface that is substantially perpendicular to the linear axis, and the second flexure plate defines a second flexure plate major surface that is also substantially perpendicular to the linear axis.

2. The testing apparatus of claim 1, wherein the linear axis is no further than 5 mm from an overall moving mass center of gravity, the overall moving mass center of gravity being defined as the center of gravity of the stage together with the actuator and the device-under-test when attached to the stage.

3. The testing apparatus of claim 1 wherein the frame includes a first aperture in the frame with the first flexure plate spanning the first aperture, and the frame includes a second aperture in the frame with the second flexure plate spanning the second aperture.

4. The testing apparatus of claim 1 wherein the first flexure plate includes a plate sub-component extending in a F1 direction, and another separate but attached plate sub-component extending in a F2 direction, the F2 direction being substantially perpendicular to the F1 direction, and both the F1 and F2 directions being substantially perpendicular to the linear axis.

5. The apparatus of claim 4 wherein the F2 direction is substantially vertical and the F1 direction is substantially horizontal.

6. The testing apparatus of claim 1 wherein the second flexure plate includes a plate sub-component extending parallel to the F1 direction, and another separate but attached plate sub-component extending parallel to the F2 direction.

7. The testing apparatus of claim 1 wherein the first flexure plate periphery and the second flexure plate periphery are each clamped to the frame.

8. The testing apparatus of claim 7 wherein the frame includes a plurality of clamping plates adjacent the first and second flexure peripheries, and each of the plurality of clamping plates is affixed to the frame by a plurality of clamping screws.

9. The testing apparatus of claim 1 wherein the actuator includes an electromagnetic solenoid.

10. The testing apparatus of claim 1 wherein the actuator includes a piezoelectric element.

11. The testing apparatus of claim 1 wherein the frame includes a plurality of frame pieces, each configured to be attached to a supporting table.

12. The testing apparatus of claim 1 wherein the each of the first and second flexure plates comprises a first material, and the frame comprises a second material having a substantially higher coefficient of thermal expansion than the first material.

13. The testing apparatus of claim 12 wherein the first material comprises steel, and the second material comprises aluminum.

14. The testing apparatus of claim 13 wherein the first flexure plate has a thickness in the range 0.05 mm to 0.3 mm, and wherein the first flexure plate defines a flexure plate length in the range 40 mm to 160 mm.

15. The testing apparatus of claim 1 wherein the actuator is attached to the stage and is disposed between the first and second flexure plates.

16. The testing apparatus of claim 1 wherein the actuator is attached to the second flexure plate and is not disposed between the first and second flexure plates.

17. A method to assemble a testing apparatus for subjecting a device-under-test to oscillating acceleration, the method comprising:
- providing a stage having a mounting surface attachable to the device-under-test; and
- coupling an actuator to the stage, the actuator also being coupled to a reaction mass movable along a linear axis;
- providing a first flexure plate comprising a first material and having a first flexure plate middle and a first flexure plate periphery, and attaching the first flexure plate middle to the stage at a first stage end,
- providing a second flexure plate comprising the first material and having a second flexure plate middle and a second flexure plate periphery, and attaching the second flexure plate middle to the stage at a second stage end that opposes the first stage end,
- providing a frame that comprises a second material having a substantially higher coefficient of thermal expansion than the first material,
- cooling the frame, and
- attaching the first flexure plate periphery and the second flexure plate periphery to the frame.

18. The method of claim 17 further comprising allowing the frame to warm to an ambient temperature after the attaching of the first flexure plate periphery and the second flexure plate periphery to the frame.

19. The method of claim 18 wherein the cooling is sufficient that the warming to the ambient temperature induces a tensile strain on the first and second flexure plates of at least 1.5 MPa.

20. The method of claim 18 wherein the first material comprises steel and the second material comprises aluminum, and the temperature of the frame after cooling is at least 10° C. below the ambient temperature.

* * * * *